A. C. GARSIDE.
RAIN AND SUN SHIELD FOR AUTOS.
APPLICATION FILED JULY 13, 1920.
1,360,919. Patented Nov. 30, 1920.
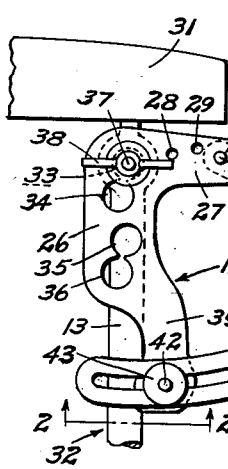
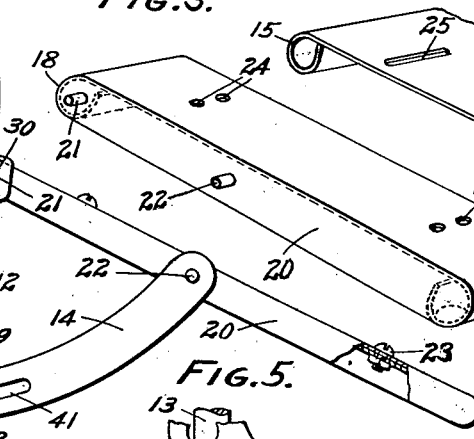
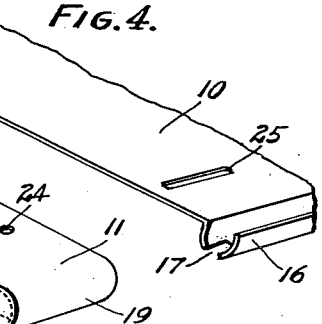
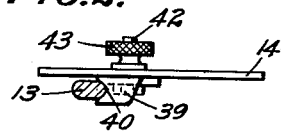
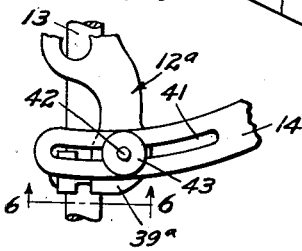
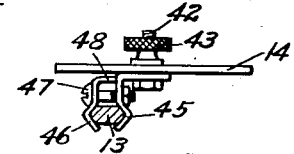
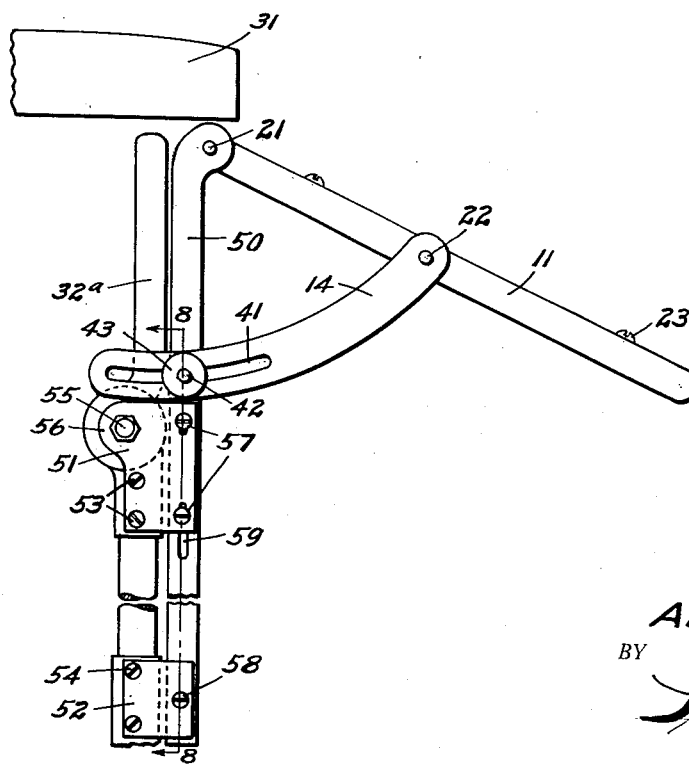
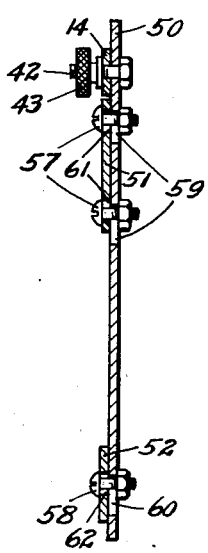
INVENTOR
ALVIN C. GARSIDE
BY
*Hazard & Miller*
ATTORNEYS.

UNITED STATES PATENT OFFICE.

ALVIN C. GARSIDE, OF GLENDALE, CALIFORNIA, ASSIGNOR OF ONE-HALF TO KARL L. GARDNER, OF GLENDALE, CALIFORNIA.

RAIN AND SUN SHIELD FOR AUTOS.

1,360,919. Specification of Letters Patent. Patented Nov. 30, 1920.

Application filed July 13, 1920. Serial No. 395,883.

*To all whom it may concern:*

Be it known that I, ALVIN C. GARSIDE, a citizen of the United States, residing at Glendale, in the county of Los Angeles and State of California, have invented new and useful Improvements in Rain and Sun Shields for Autos, of which the following is a specification.

This invention relates to rain and sun shields for motor vehicles, and the like, and has for its principal object the provision of a device of this character which may be applied to windshields of various makes and embodying a construction which will enable its lateral adjustment to fit windshields of various widths.

It is a further object of my invention to provide a shield which is simple and durable in construction, cheap to manufacture, and which may be easily and quickly attached to and detached from a windshield of a motor vehicle.

The merits of my invention will be more fully set forth in the following specification, taken in connection with the accompanying drawings, in which:

Figure 1 is an end elevation showing my device as applied to the windshield of an automobile.

Fig. 2 is a detail view of one of the adjusting screws, taken as indicated by the line 2—2 of Fig. 1.

Fig. 3 is a perspective of one of the end shoes.

Fig. 4 is a fragmentary perspective showing one end of the plate or shield.

Fig. 5 is a fragmentary elevation showing a modified form of bracket and attaching means.

Fig. 6 is a transverse section of same as indicated by the line 6—6 of Fig. 5.

Fig. 7 is an end elevation showing another modified form of my device as applied to a windshield, and Fig. 8 is a transverse section taken as indicated by the line 8—8 of Fig. 7.

In its preferred embodiment my invention comprises essentially an opaque plate 10, preferably constructed of metal, or other suitable material, and a shoe 11 also constructed of metal adapted to slip over the transverse ends of the plate 10, the whole being pivotally supported between adjustable brackets 12 secured to the side rails 13 of a windshield, angular position of the shield being adjustable by means of an arcuate arm 14.

The inner end of the plate 10 is bent to form a tubular portion 15 extending along this longitudinal edge; the opposite longitudinal edge being bent to form a U-shaped channel 16, as clearly indicated in Fig. 4. These return bends along the longitudinal edges are primarily for the purpose of adding stability to the plate 10, and in addition to this, the U-shaped channel 16 forms a trough or gutter to carry off rain water, which is drained therefrom through apertures 17 in either end.

The shoes 11 are preferably constructed of metal and are bent along their edges to form return bends 18 and 19, which are adapted to receive the bends 15 and 16, respectively, of the plate 10. The bends 18 and 19 are made slightly smaller in diameter than the bends 15 and 16 in order to insure a tight fit and prevent the parts from rattling when placed together. The shoes 11 have outer end walls 20 along their transverse sides, a pivot pin 21 being supported in said wall in axial alinement with the tubular portion 15 of the plate 10, and a smaller pin 22 being likewise supported at a point intermediate the ends 18 and 19 and preferably adjacent the center thereof. The shoes 11 are adapted to be longitudinally adjustable on the plate 10 by means of bolts 23 extending through perforations 24 and longitudinally slidable in slotted ways 25 adjacent the inner and longitudinal edges of the plate 10. The lower sides of the shoes 11 are left open as indicated by dotted lines in Fig. 3.

The brackets 12 have a body portion 26 and an upper outwardly extending arm 27 in which are perforations 28, 29 and 30 for the reception of the pivot pins 21 on the shoes 11. This plurality of apertures is provided in order to enable the adjustment of the shield to various types of cars wherein the top 31 extends outwardly from the windshield 32 varying distances, and to bring the inner longitudinal edge of the shield under this forward edge of the top, and to properly shed rainwater.

The body portions 26 of the bracket 12 are likewise provided with a plurality of transverse apertures 33, 34, 35 and 36 to enable its vertical adjustment with reference to the windshield 32 and the top 31, as and for the reason hereinbefore stated. This construction enables the bracket to be secured to the windshield by using the screw 37 and thumb nut 38 usually provided for adjustment of the upper glass therein.

The downwardly extending portion 39 of the bracket 12 has a V-shaped recess 40 adapted to bear against the side rail 13 of the windshield, and to be held in normal contact therewith by the combined weight of the shield and the clamp of the thumb nut 38.

The shield is adjusted to various positions of angularity with reference to the windshield 32 by means of the arcuate arms 14 which are pivoted to the shoes 11 by means of the pivot pins 22; the said arms having slotted ways 41 in their distal ends through which bolts 42 passing through the downwardly extending portion 39 of the brackets 12, extend, the said bolts being provided with knurled thumb nuts 43 to clamp these two members rigidly together.

In the modified form of the bracket disclosed in Figs. 5 and 6 I provide a bracket 12ª having a downwardly extending portion 39ª which is bent outwardly to form a clamp member 45 and having an opposed clamp member 46 adjustably secured thereto by means of a bolt 47. The member 46 is provided with an arm 48 contacting with the member 45 in order to form a more rigid gripping means.

In the modified form shown in Figs. 7 and 8 I provide a bracket 50, preferably constructed of sheet metal, and which is secured to the windshield by means of plates 51 and 52 through the medium of screws 53 and 54, or any other suitable means. The plate 51 is preferably attached adjacent the center joint of the windshield 32ª, the pivot bolt 55 thereof extending through an ear 56 formed integral therewith. The bracket 50 is vertically adjustable with reference to the plates 51 and 52 by means of bolts 57 and 58 extending through the plates 51 and 52, respectively, and engaging slots 59 and 60 in the bracket 50. The plates 51 and 52 may likewise be slotted as at 61 and 62 for the reception of the bolts 57 and 58, respectively.

Although I have here shown and described the preferred form of my device, it is understood that I reserve the right to resort to any modifications of structure that properly come within the scope of the claims.

Having described my invention, I claim:

1. A rain and sun shield for automobiles comprising a metal plate bent along its longitudinal edges to form a tubular portion along its inner edge and a U-shaped channel along its outer edge, metal shoe members adapted to receive the transverse ends of said plate, said members having return bends along their edges to conform to the bent edges of said plate, and having end walls, pivot pins extending outwardly from said end walls in axial alinement with the tubular portion of the plate, and a similar pin adjacent the transverse center thereof, adjustable brackets adapted to be removably secured to the side rails of a windshield pivotally supporting said end members, arcuate arms pivoted on said pins adjacent the center of the end members, said arcuate arms having slotted ways in their distal ends to receive adjusting bolts secured to the lower end of the bracket to adjust the plate in different positions of angularity, and bolts in the said end members coacting with slots in the plate to vary the longitudinal length of the shield.

2. A rain and sun shield for automobiles comprising a metal plate having a tubular portion along its inner longitudinal edge and a U-shaped channel along its outer longitudinal edge, shoes adapted to receive the transverse ends of the plate and longitudinally adjustable thereon, said shoes having end walls supporting pivot pins extending outwardly therefrom in axial alinement with the tubular portion of the plate, adjustable supporting brackets removably secured to the windshield and pivotally supporting the shoe member, arcuate arms pivoted to the shoes adjacent their transverse centers and having slotted ways at their distal ends to receive adjusting bolts in the brackets.

3. A rain and sun shield for automobiles comprising a metal plate bent to form a tubular portion along its inner longitudinal edge and a U-shaped channel along its outer edge, shoes adapted to receive the transverse ends of the plate and longitudinally adjustable therein, adjustable brackets removably secured to the windshield and pivotally supporting the shield, and arcuate arms pivoted to the shoes and adjustably secured to the supporting brackets to hold the shield in various positions.

In testimony whereof I have signed my name to this specification.

ALVIN C. GARSIDE.